United States Patent [19]

Koppens

[11] 4,254,534
[45] Mar. 10, 1981

[54] APPARATUS FOR USE IN THE MANUFACTURE OF DISC-LIKE PRODUCTS

[76] Inventor: Wilhelmus F. A. Koppens, Hoekendaal 12, 5761 CK Bakel, Netherlands

[21] Appl. No.: 9,770

[22] Filed: Feb. 6, 1979

[30] Foreign Application Priority Data

Feb. 10, 1978 [NL] Netherlands ............... 7801537

[51] Int. Cl.³ .................................... A22C 7/00
[52] U.S. Cl. ................................. 17/32; 425/239
[58] Field of Search ............. 17/32; 425/239, 240, 425/227

[56] References Cited

U.S. PATENT DOCUMENTS

| 1,513,157 | 10/1924 | Clayton | 425/239 X |
| 2,539,319 | 1/1951 | Oyer | 425/240 |
| 3,312,997 | 4/1967 | Merrels | 17/32 |
| 3,526,923 | 9/1970 | Barnes, Jr. | 17/32 |

Primary Examiner—Willie G. Abercrombie

[57] ABSTRACT

Apparatus for use in the manufacture of disc-like products from semi-solid foodstuffs comprises a hopper, a compression chamber (8) communicating with the hopper, a pusher (21) slidable along an associated side wall (2) within the hopper for advancing foodstuff from the hopper into the compression chamber (8), and a plate (19) having at least one aperture (18) for receiving foodstuff from the compression chamber (8) and for forming said foodstuff into disc-like products, the side wall (2) of the hopper being inclined relative to the plate (19) and lying in the same plane as a side wall (7) of the compression chamber.

10 Claims, 4 Drawing Figures

APPARATUS FOR USE IN THE MANUFACTURE OF DISC-LIKE PRODUCTS

DESCRIPTION

The invention relates to apparatus for use in the manufacture of disc-like products from semi-solid foodstuffs such as ground meat.

The invention has for its object to provide apparatus of simple construction, in which the foodstuff may be gradually and effectively pushed into a compression chamber from a hopper prior to the formation of the products.

According to the present invention there is provided apparatus for use in the manufacture of disc-like products from semi-solid foodstuffs, said apparatus comprising a hopper, a compression chamber communicating with the hopper, a pusher slidable along an associated side wall within the hopper for advancing foodstuff from the hopper into the compression chamber, and a plate having at least one aperture for receiving foodstuff from the compression chamber and for forming said foodstuff into disc-like products, said side wall of the hopper being inclined relative to the plate and lying in the same plane as a side wall of the compression chamber.

An effective, positive displacement of foodstuff from the hopper into the compression chamber may be obtained by means of the pusher, which may be disposed on one side of the hopper thus leaving the top of the hopper free for filling the hopper with foodstuff.

The invention is described further, by way of example, with reference to the accompanying drawings, in which:

FIGS. 1A and 1B show the plate in second and third positions respectively beneath the hopper.

Figure 1:
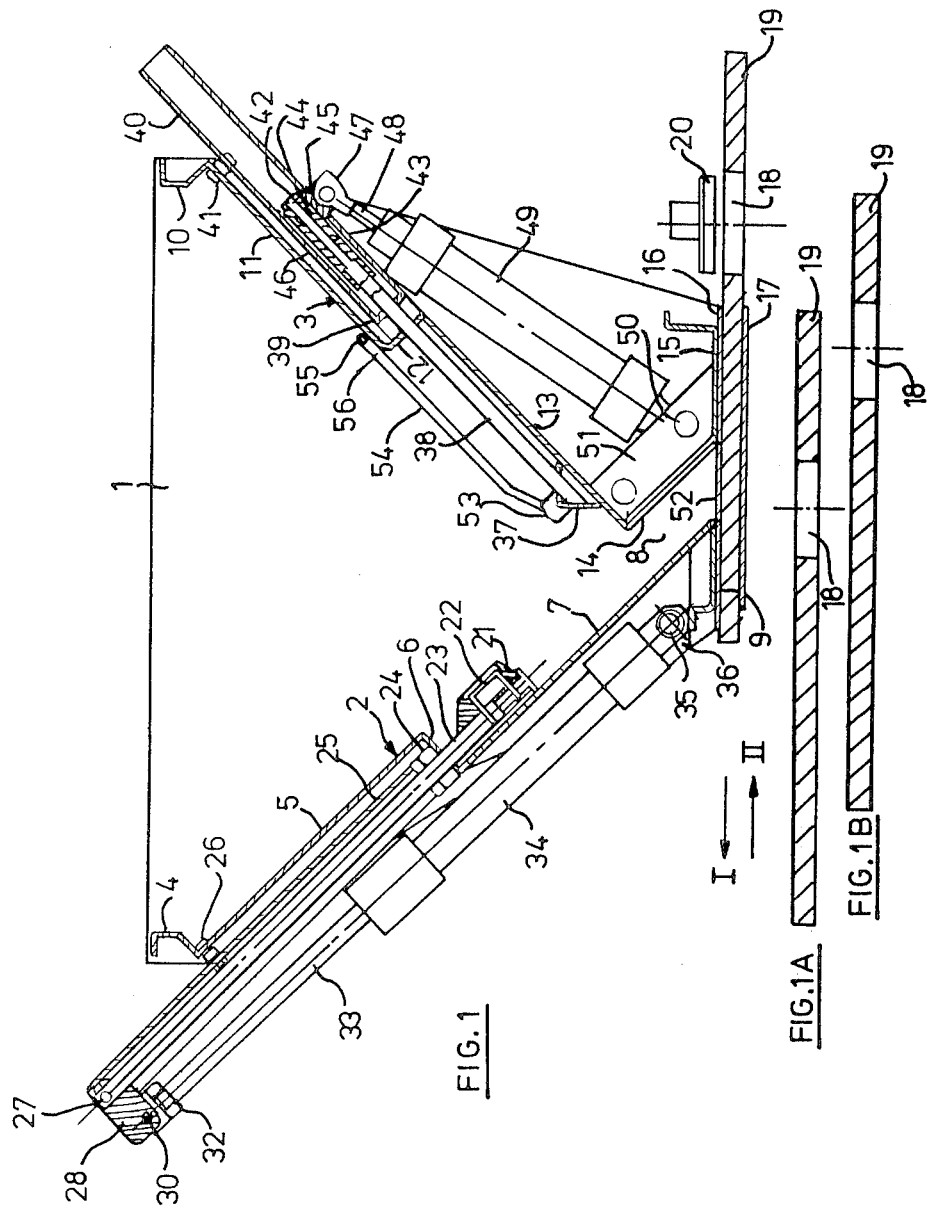
FIG. 1 is a schematic sectional view of apparatus in accordance with the invention with an apertured plate in a first position beneath a hopper.
Figure 2:
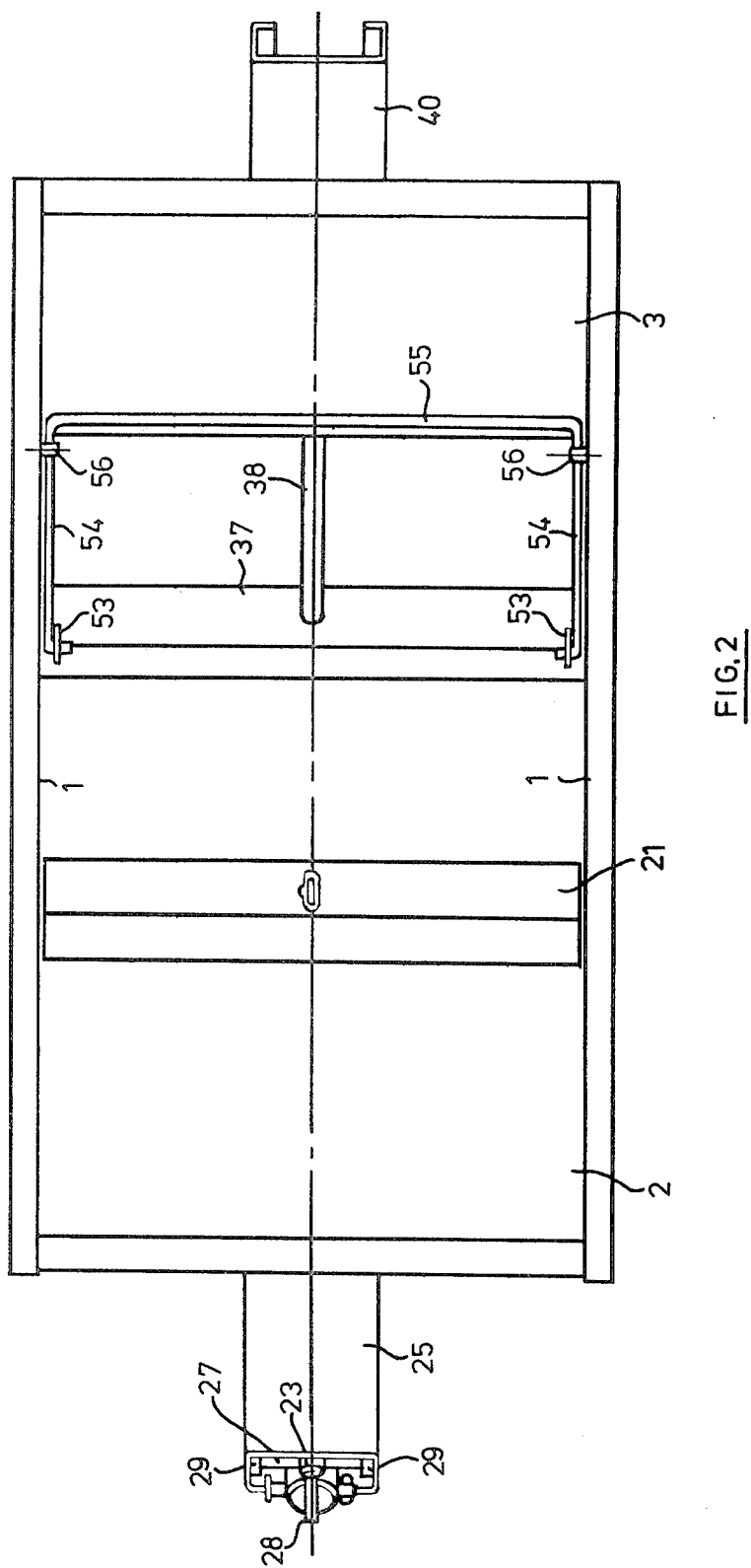
FIG. 2 is a schematic plan view of the apparatus of FIG. 1.

The apparatus shown in the Figures comprises a hopper having two spaced parallel side walls 1 extending, as shown in FIG. 1, parallel to the plane of the drawing, and side walls 2 and 3 inclined toward one another from top to bottom.

The wall 2 has its upper edge a profiled rim 4 which joins a downwardly inclined wall portion 5, connected in a stepped manner by a portion 6 at right angles thereto with a wall portion 7 extending parallel to the wall portion 5. The lower part of the wall portion 7 bounds a compression chamber 8 and joins an outwardly bent wall support 9.

The wall 3 also has at its upper edge a rim 10 corresponding with the rim 4, the rim 10 joining a downwardly inclined wall portion 11 extending generally towards the front wall 2. The wall portion 11 is connected in a stepped manner by a portion 12 at right angles to said wall portion 11 with a wall portion 13 extending parallel to the wall portion 13 extending parallel to the wall portion 11. This wall portion 13 is bent outwardly at right angles at its lower end to form a second wall 14 bounding the compression chamber 8 and the wall 14 is connected to an outwardly extending wall support 15.

Two parallel spaced plates 16 and 17 are arranged beneath the supports 9,15 with the plate 16 carrying the supports. Between the plates 16 and 17 a plate 19 is reciprocable in a horizontal plate with the aid of drive means (not shown), as indicated by the arrows I and II.

The plate 19 preferably has a series of apertures 18 through which, in the position of the plate 19 shown in FIG. 1, expellers 20 can be moved for expelling products located in the apertures 18.

Within the hopper there is provided a pusher 21 formed by an elongate bar extending between the side walls 1 and having one side in sliding contact with the portion 7 of the wall 2. This pusher is fastened with the aid of a resilient, U-shaped bracket 22 to a lower end of a rod 23, which passes through an opening in the portion of the wall 2 and which extends outside the hopper parallel to the wall portion 5. The rod 23 is guided in the region of the portion 6 by guide rings 24, fastened to a lower end of a C-sectioned beam 25, which is secured by bolts 26 to the hopper so as to be parallel to the wall portion 5.

An upper end of the rod 23 is provided with a pin 27 extending at right angles to the longitudinal axis of the rod 23 and a coupling piece 28. The ends of the pin 27 project beyond the rod 23 and are fastened to guide rollers 29 arranged to run in the beam 25. The coupling piece 28 is rigidly received to the rod 23 and is coupled furthermore with the aid of a pin 30 extending parallel to the pin 27 with a U-shaped bracket 32 fastened to the free end of a piston rod 33 of an hydraulic or pneumatic control cylinder 34. At its end remote from the piston rod 33, the cylinder 34 is pivotally connected by way of pin 35 extending parallel to the pin 30 to supports 36 fastened to the wall 2 of the hopper.

Supported on the portion 13 of the rear wall 3 is a wiper member 37, which is formed in the embodiment shown by an angled bar extending between the side walls 1 and having its elongate edges in contact with the wall portion 13. The wiper bar is secured to an end of a rod 38, which passes through an opening in the portion 12 of the wall 3 and is guided adjacent said portion 12 by rings 39 fastened to a lower end of a C-sectioned beam 40. The beam 40 extends outside the hopper along the wall portion 11, to which it is fastened by bolts 41.

By means of a bolt 42, a block 43 is fastened to the end of the rod 38 projecting from the hopper. To this block are rigidly secured stub shafts 44, extending at right angles to the axis of the rod 38, and a connecting lug 45. Free ends of the stub shafts 44 are provided with guide rollers 46 arranged to run in the beam 40.

An end of a piston rod 48 of a pneumatically or hydraulically actuable control cylinder 49 is coupled with the lug 45 by means of a pin 47. The end of the cylinder 49 remote from the piston rod 48 is pivotally connected by means of a pin 50 to supports 51 provided near the base of the hopper.

Ears 53 extend from the wiper bar 37 and pivotally carry a U-shaped bracket, having two limbs 54 located adjacent to the walls 1 and a bridge 55, turned-in ends of the limbs 54 engaging the ears 53. The bridge 55 bears on the wall portion 11 and is prevented from rising away from the wall portion 11 by pins 56 fastened to the walls 1.

Operation of the apparatus is as follows:

The hopper is first filled with a semi-solid foodstuff, for example, ground meat.

Starting from the position shown in FIG. 1, the plate 19 moves in the direction of the arrow I towards the position shown in FIG. 1A, whilst at the same time the pusher 21 is urged downwards by the control cylinder 34. Foodstuff encountered by the pusher 21 is thus urged into the compression chamber 8.

At the instant at which the apertures 18 communicate with an opening 52 in the plate 16, forming an outlet of the compression chamber 8, the foodstuff located in the compression chamber 8 is being subjected to pressure by the pusher 21 so that this foodstuff is forced into the apertures 18, the plate 19 at the same time moving in the direction of the arrow I into the position shown in FIG. 1A. A flow of foodstuff back from the compression chamber 8 into the body of the hopper is prevented by the pusher which fits snugly into the compression chamber 8.

From the position shown in FIG. 1A the plate 19 is moved back in the direction of the arrow II, the pressure on the foodstuff in the compression chamber 8 being maintained with the aid of the pusher 21 until the plate 19 has reached the position shown in FIG. 1B, in which the communication between the outlet opening 52 and the apertures 18 is interrupted.

During the movement of the plate 19 from the position shown in FIG. 1A to the position shown in FIG. 1B, the wiper member 37 with the bracket 54,55 fastened thereto is moved upwards along the wall 3 under the action of the control cylinder 49 at a rate such that the foodstuff contained in the hopper cannot follow the movement of the wiper member and bracket due to inertia of the foodstuff.

Upon arrival of the plate 19 at the position shown in FIG. 1B the pusher 21 starts moving upwardly under the action of the control cylinder 34 along the wall portion 7 and simultaneously the wiper member 37 is moved slowly down the wall portion 13 by the control cylinder 49 so that the bracket 54,55 also moves down the wall portion 11. As a result foodstuff is urged into the compression chamber 8 by the wiper member 37 and the bracket 54,55.

It will be obvious that suitable control means (not shown) are provided for synchronizing the movements of the various parts of the apparatus.

The invention thus provides a simple and effective construction, and the hopper is readily accessible for the introduction of foodstuff at the top. A satisfactory displacement of foodstuff towards the compression chamber 8 is ensured, the pusher being in an advantageous position relative to the compression chamber and the latter being in an advantageous position relative to the apertures 18 in the plate 19 for ensuring a uniform displacement of the foodstuff. Furthermore the controls for the pusher and the wiper members are effectively disposed outside the hopper without forming troublesome extensions thereon.

It should be noted that the region of the guide plate 17 located opposite the outlet opening 52 of the compression chamber 8 is preferably perforated so that whilst foodstuff is forced into the apertures 18 air can escape through the perforation. The perforation is, of course, such that foodstuff cannot escape through it.

I claim:

1. Apparatus for use in the manufacture of disc-like products from semi-solid foodstuffs,
    said apparatus comprising a hopper including a first side wall having first and second offset portions, an interconnecting wall portion and a pair of additional side walls disposed laterally of the first side wall,
    a compression chamber having a side wall and an inlet communicating with the hopper,
    a plate having at least one aperture for receiving foodstuff from the compression chamber and for forming said foodstuff into disc-like products,
    said first side wall portion being inclined relative to the plate and lying in the same plane as the side wall of the compression chamber,
    a pusher slidable along the first side wall portion and within the hopper for advancing foodstuff from the hopper into the compression chamber,
    a rod secured to the pusher and extending outside the hopper through the interconnecting wall portion,
    a control cylinder extending along the outer side of the first side wall and being coupled to the rod,
    said pusher comprising a body extending transversely of said first side wall and between the two additional side walls, said body having one position which is substantially close to the inlet opening of the compression chamber.

2. The apparatus set forth in claim 1 wherein said hopper has a further side wall opposite the first side wall and which is inclined relative to the plate and in an opposite sense relative to said first side wall, said further wall including a first portion disposed at an angle to and in contact with the side wall of the compression chamber, said further side wall also including a second portion parallel to the first portion and a wall interconnecting the first and second portions of said further side wall, a wiper disposed for displacement along the first portion of said further side wall, a drive rod extending through the connecting wall and being connected to the wiper.

3. Apparatus as claimed in claim 1 in which the plate and the pusher are constructed and arranged to move in synchronism such, that the at least one aperture of the plate communicates with the compression chamber, whilst foodstuff in the compression chamber is exposed to pressure from the pusher and such that the pusher continues to apply pressure to foodstuff in the compression chamber until communication between the at least one aperture of the compression chamber is interrupted.

4. Apparatus for use in the manufacture of disc-like products from semi-solid foodstuffs,
    said apparatus comprising a hopper including a first side wall,
    a compression chamber having a side wall and an inlet communicating with the hopper,
    a plate having at least one aperture for receiving foodstuff from the compression chamber and for forming said foodstuff into disc-like products,
    said first side wall being inclined relative to the plate and lying in the same plane as the side wall of the compression chamber,
    a pusher slidable along the first side wall and within the hopper for advancing foodstuff from the hopper into the compression chamber, said hopper having a further side wall opposite the first side wall and which is inclined relative to the plate and in an opposite sense relative to said first side wall, said further wall including a first portion disposed at an angle to and in contact with the side wall of the compression chamber, said further side wall also including a second portion parallel to the first portion and a wall interconnecting the first and second portions of said further side wall, a wiper disposed for displacement along the first portion of said further side wall, a drive rod extending through the connecting wall and being connected to the wiper.

5. Apparatus as claimed in claim 4 in which a control cylinder extends along the outer side of said further side wall of the hopper, said rod being coupled to said cylinder.

6. Apparatus as claimed in claim 5 in which a bracket is coupled with the wiper member, said bracket being displaceable along said other portion of said further side wall.

7. Apparatus as claimed in claim 4 in which the wiper is constructed and arranged to move rapidly away from the compression chamber along the further side wall, whilst the compression chamber is closed by the pusher and to move slowly towards the compression chamber during a movement of the pusher away from the compression chamber.

8. Apparatus according to claims 4, 6 or 7 wherein said first side wall has first and second offset portions and an interconnecting wall portion, said pusher being slidable along the first side wall portion and within the hopper, a rod secured to the pusher and extending outside the hopper through the interconnecting wall portion, a control cylinder extending along the outer side of the first side wall and being coupled to the rod.

9. Apparatus as claimed in claim 4 in which the hopper includes a pair of additional side walls disposed laterally of the first side wall, said pusher comprising a body extending transversely of said first side wall and between two additional side walls the body being arranged, in one position thereof, substantially to close an inlet of the compression chamber.

10. Apparatus as claimed in claim 8 in which the hopper includes a pair of additional side walls disposed laterally of the first side wall, said pusher comprising a body extending transversely of said first side wall and between two additional side walls the body being arranged, in one position thereof, substantially to close an inlet of the compression chamber.

* * * * *